United States Patent [19]

Yamada et al.

[11] Patent Number: 5,010,430
[45] Date of Patent: Apr. 23, 1991

[54] HEAD SLIDER ARRANGEMENT FOR MAGNETIC DISK STORAGE DEVICE

[75] Inventors: Takehito Yamada, Kanagawa; Kazushi Tanimoto, Tokyo; Yuji Sakai; Takao Muraoka, both of Kanagawa; Tetsuo Inoue, Chiba; Yoshinao Takada, Kanagawa, all of Japan

[73] Assignee: Kabushiki Kaisha Toshiba, Kawasaki, Japan

[21] Appl. No.: 226,062

[22] Filed: Jul. 29, 1988

[30] Foreign Application Priority Data

Jul. 30, 1987 [JP] Japan .................. 62-191410
Aug. 13, 1987 [JP] Japan .................. 62-202236
Dec. 11, 1987 [JP] Japan .................. 62-311884

[51] Int. Cl.$^5$ .......................... G11B 5/60; G11B 5/596
[52] U.S. Cl. ............................. 360/103; 360/77.08
[58] Field of Search ............. 360/103, 121, 77.08, 360/77.11

[56] References Cited

U.S. PATENT DOCUMENTS

| | | | |
|---|---|---|---|
| 4,435,736 | 3/1984 | Herman | 360/103 |
| 4,636,894 | 1/1987 | Mo | 360/103 |
| 4,729,048 | 3/1988 | Imakoshi | 360/103 |

OTHER PUBLICATIONS

"Technologies for High Recording Density in Large-Capacity Fast-Access Magnetic Disk Storage"; Y. Mitsuya, S. Takanami IEEE 1987 MAG-23, No. 5.

Primary Examiner—A. J. Heinz
Attorney, Agent, or Firm—Oblon, Spivak, McClelland, Maier & Neustadt

[57] ABSTRACT

A magnetic disk storage device has a magnetic disk with a storing/reproduction region formed thereon and a head slider facing the disk surface with a plurality of parallel projections to generate an air bearing. Magnetic heads each having a head gap are provided in the projections and have an interval between head gaps of at least 1/N of the width of the whole storing/reproduction region of the disk where N is the number of heads. The device makes it feasible to increase the number of heads per disk and to shorten the seek distance without increasing the weight of the head actuator.

21 Claims, 14 Drawing Sheets

HEAD SLIDER ARRANGEMENT FOR MAGNETIC DISK STORAGE DEVICE

BACKGROUND OF THE INVENTION

1. Field of the Invention

This invention is related to a magnetic disk storage device, and especially to a magnetic disk storage device assembled with an improved magnetic head.

2. Discussion of the Background

In conventional magnetic disk storage devices, the signal recording and reproduction are generally carried out with a single magnetic head for the whole surface of a magnetic disk.

FIG. 20 shows an example of the conventional magnetic disk storage device. In this figure, reference 1 shows a magnetic disk, 2 shows a head slider, and 3 is a gimbal which supports the head slider 2. In conventional devices, a single head gap is generally provided for one head slider 2, and the signal recording and reproduction are carried out for the entire data recording and reproduction area on magnetic disk 1 using this head.

Consequently, one head has to move from the innermost circumference to the outermost circumference of the data recording and reproduction area as shown in FIG. 20. This causes a problem in that it increases the seeking distance of the head. The reference 4 in FIG. 20 indicates the effective area of the disk 1. The time required for seeking by the head is proportionate to a ½ multiple of the seek distance assuming that the thrust of the head actuator is fixed. In response to a large demand for high speed and large capacity in this magnetic disk storage device, the seek distance must be shortened to achieve the high speed. An effective reduction of the seek distance is demanded for the purpose. There is a magnetic disk storage device provided with two sets of heads 2 and gimbals 3 on an actuator for the one face of a disk 1 as shown in FIG. 21 for the reduction seek distance 4. In this figure, two head sliders 2 take charge of the data recording and reproducing for the inner half and outer half of the recording and reproduction area, respectively. This reduces the seek distance 4 by a half as compared with the case of a single head.

In fact, however, since twice the number of the head sliders 2 and gimbals 3 are needed for this purpose, the weight of the actuator increases as a whole. On the other hand, since the seek time is proportionate to a ½ multiple of the weight of the head actuator, the increase in the weight of the head actuator acts against the purpose of shortening the seek time. Then is is necessary to shorten the seek time without increasing the weight of the head actuator.

In the case where two sets of head sliders 2 and gimbals 3 are used like this, two areas of landing zones 5 are required in a contact start/stop (CSS) as shown in the oblique lined portions in FIG. 22. Since the width of one landing zone 5 is larger than that of the head slider 2, if two areas of landing zones 5 are provided, a rate occupied by the landing zone 5 in the whole recording and reproduction area increases greatly. This inevitably reduces the effective area where the signal can be recorded and reproduced on the surface of magnetic disk 1. It also goes against the purpose of enlarging the capacity of the magentic disk storage device. Then, another necessity arises to increase the number of heads per face of the magnetic disk 1 without increasing the area of the landing zone 5.

In conventional magnetic disk storage devices, the relative speed between an air bearing surface (ABS) section (ski section) of the head slider 2 and the rotating magnetic disk 1 is proportionate to the distance from the center of rotation of the magnetic disk 1 to the ABS section. The floating force generated in the ABS section is relatively increased as the speed raises.

In the conventional magnetic disk storage devices as shown in FIG, 23, the actually used head is only one side head with good characteristic. The other side head (described by oblique line) is not used. Namely, one head covers the whole of the recoding and reproduction area. A pivot 6 of the gimbal 3 which supports the head slider 2 is positioned on a center line of equal distance from the right and left hands 7. The width and structure of the right and left ABS section 8 of the head slider 2 are the same. When the interval between the two ABS sections 8 is made larger compared to the radius of the magnetic disk 1, the difference in the relative speed between two ABS sections 8 becomes larger. This makes the amount of float different between the right and left ABS sections, and also the floating posture of the head slider 2 unstable. This hinders an exact data recording and reproduction. In this figure, reference 1 shows the magnetic disk and 9 shows a suspension.

In order to improve the tracking density in this magnetic disk storage device by raising the accuracy in positioning, servo information to provide the track positioning data is formed beforehand on the magnetic disk. This is to follow up the track oscillation of its data tracking caused by deformation of the disk due to changes in temperature and humidity by applying a closed loop control to the head to make it follow up the data track accurately according to the servo data.

In this data surface servo method in which the servo data is formed beforehand on the same magnetic disk for the positioning of the head, the surface of the magnetic disk 11 is divided in the circumferential direction to keep the servo data written in a part of its servo sector 12 as shown in FIG. 24. The servo pattern which becomes the servo data at this time consists of servo patterns A, B, C and D which detect the track finely and other servo patterns P, Q and R which detect the track coarsely as shown enlarged in the lower part of FIG. 24. Although, the track can be detected with a 16 tracking cycle in this example, it would be necessary to increase the number of servo patterns to detect the track with a longer cycle.

These servo patterns are formed almost throughout the area of the servo sector 12. This poses a problem in that the head, when there is one, has to move from the innermost circumference to the outermost circumference of the recoding area. This causes the seek distance by the head 13 to become longer. The seek time must be shortened to meet the prevailing demand for a higher speed and capacity for the magnetic disk. For the purpose, it is necessary to reduce the seek distance effectively. There is a servo surface servo method which provides an exclusive surface to form the servo data for positioning on one of a plurality of magnetic disks and an exclusive head for the servo data reproduction.

In this servo surface servo method, one head exclusively for the data reproduction and a plural number of data recording and reproducing heads are mounted on a same head actuator through an gimbal. The biggest problem in this methos lies in the fact that even though the thermal expansion coefficient is assumed to be the same in the disk, head, gimabl and head actuator on both the servo surface and data surface, the amount of a metaphysical change might vary due to depression in the temperature distribution according to location. This causes an off-track condition (a thermal off-track). In addition, the off-track might occur after a lapse of time, due to a change after lapse of time of in their mounting sections, etc.

Futhermore, a combined method of the servo surface servo and sector is also proposed as a method, which is free from such a thermal off-track, which can take the servo zone higher. This method, too, has a shortcoming in that the formatting is worsened due to the increase in the servo data area.

In an effort to shorten the seek distance and to reduce the seek time for the realization of a high speed of the magnetic disk storage device so far, it has been tried to shorten the seek distance by providing two sets of head sliders and gimbals for one magnetic disk surface. In this method, however, the weight of the head actuator increases. This goes against the purpose of shortening the seek time. To the worse, the area of the landing zone is doubled on account of two heads provided in this method, this causing another problem to reduce the effective operating area per one disk surface.

When the width of the head slider was made larger relatively as compared with the radius of the disk in a conventional magnetic disk storage device, a difference occurred in the floating force between the inner and outer sides of the head slider. This caused the floating posture of the head slider to become unstable as a hindrance for an accurate data recoding and reproduction.

In the conventional magnetic disk storage device in which one magnetic head is provided for one head slider, the position of the servo head is apart from that of the data head and also they are connected through many different components such as the gimbal and head actuator, etc. As a result, a thermal off-track occurs due to dispersion of the temperature distribution according to location in the servo surface servo method. While, in the sector servo method, although the thermal off-track does not occur, the servo zone could not be taken higher.

In these servo methods, since the servo data is formed in the same area where the data is recorded and reproduced, the formatting efficiency becomes worse as compared with a non-servo positioning method using a stepping motor, etc. When the servo data is formed on the data surface lest the thermal off-track occurrs for instance, the track density raises, but the formatting efficiency lowers and the data format storage capacity does not raise in proportion to the track density. To move the head acutuator at a high speed to shorten the seek time, it becomes necessary to increase servo patterns to raise the track detecting capacity. This might cause trouble in reducing the effective area where the signal can be recorded and reproduced on one of the disks due to an increase in the rate of the servo data occupying the entire recording area.

SUMMARY OF THE INVENTION

An object of this invention is to provide a magnetic disk storage device which makes it feasible to increase the number of heads per one disk and to shorten the seek distance without increasing the weight of the head actuator.

Another object of this invention is to provide a magnetic disk storage device which makes it feasible to secure the track detecting capacity and to realize a precise positioning even if the area occupied by servo patterns is decreased.

A further object of this invention is to provide a magnetic disk storage device which can stabilize the floating posture of the head slider to make an accurate data recording and reproduction.

According to this invention, a magnetic disk storage device comprises a magnetic disk forming a storing/reproduction region thereon, a head slider facing the disk surface having a plurality of parallel projections to generate the air bearing, magnetic heads forming a head gap with N projections and having neighboring head gap interval of at least 1/N of the width of the whole storing/reproduction region of the disk where N is number of heads.

BRIEF DESCRIPTION OF THE DRAWINGS

A more complete appreciation of the invention and many of the attendant advantages thereof will be readily obtained as the same becomes understood by reference to the following detailed description when considered in connection with the accompanying drawings, wherein.

DESCRIPTION OF THE PREFERRED EMBODIMENTS

Figure 1:
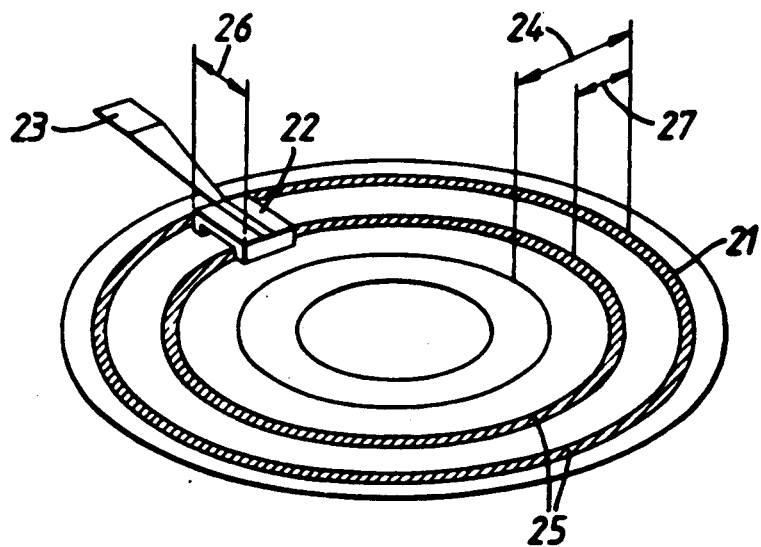
FIG. 1 is a perspective view showing the outline of an embodiment of this invention.

The following is a description of embodiments in this invention with reference to each figure mentioned. In FIG. 1, reference 21 is a magnetic disk, 22 is a head slider and 23 is a gimbal supporting it. Reference 24 is the enitre data recording and reproduction area where the data is recorded and reproduced, and 25 is the landing zone of the head.

Figure 2:
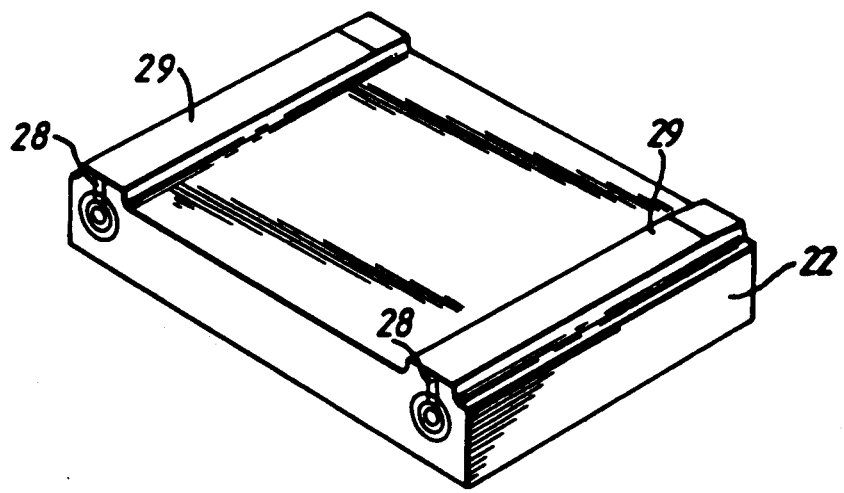
FIG. 2 is an enlarged perspective view of the head slider shown in FIG. 1.

Reference 26 is the interval between heads and 27 shows the seek distance. FIG. 2 shows a reversed view of the head slider 22. A head gap 28 is provided at the back end of the ABS (ski) section 29, and the interval between the gaps is more than about 1/N of the width of the entire data recording and reproduction area 24 on the magnetic disk 21 and yet it is made smaller than the width the entire data reccording and reproduction area 24.

The head on the outer circumferential side takes charge of the recording and reproduction of the outer half of the data in the entire data recording and reproduction area 24, while the inner circumferential side head takes charge of the entire data recording and reproduction area 24. For this reason, the heads can access the track of the entire data recording and reproduction area 24 merely by seeking about half of the entire data recording and reproduction area 24. This makes it clear that the seek distance can be shortened as compared with the conventional device which provides one head gap for one head slider.

When a plural number of heads were provided for one magnetic disk, each head was supported by a separate gimbal in the conventional device, thus causing a problem by increasing the weight of the head carriage as a whole. In this embodiment, one head slider 22 include the weight of the head slider 22 itself enlarged by the width of head slider 22. This is smaller compared with the weight of a gimbal, and the weight is little increased in this embodiment as compared with a case where two sets of head sliders and gimbals are used.

Figure 3:
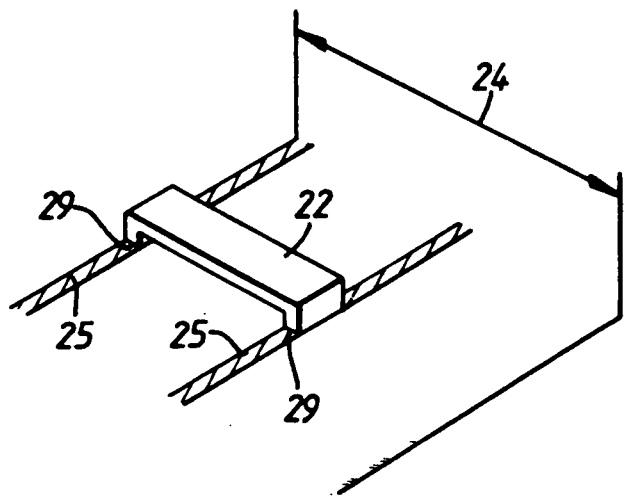
FIG. 3 is an important part perspective view for the description of operation in this invention.

From these facts, it is feasible in this embodiment to increase the number of heads per magnetic disk and to shorten the seek distance without increasing the weight of the head actuator. Although the head landing zone is provided for CSS, when N pieces (N: an integer of two or more) of heads are used per one disk in a conventional device, it needs N pieces of landing zones having a larger width than the width of head slider. The CSS in this embodiment is carried out in the ABS section 29 only as shown in FIG. 3 when the head slider 22 is positioned in the CSS position. Consequently, the width of landing zone 25 in this embodiment can be a vicinity of the width of the ABS section 29 of head slider 22. If so, the width can be reduced to one-third to one-fourth of the landing zone in a conventional device.

By this, the recording surface of a disk can be used effectively without increasing the rate in the landing zone occupying the effective area on the disk surface as in a conventional device, even if the number of heads is increased per a disk. This is suitable for the enlargement of a capacity of magnetic disk storage device.

Figure 4:
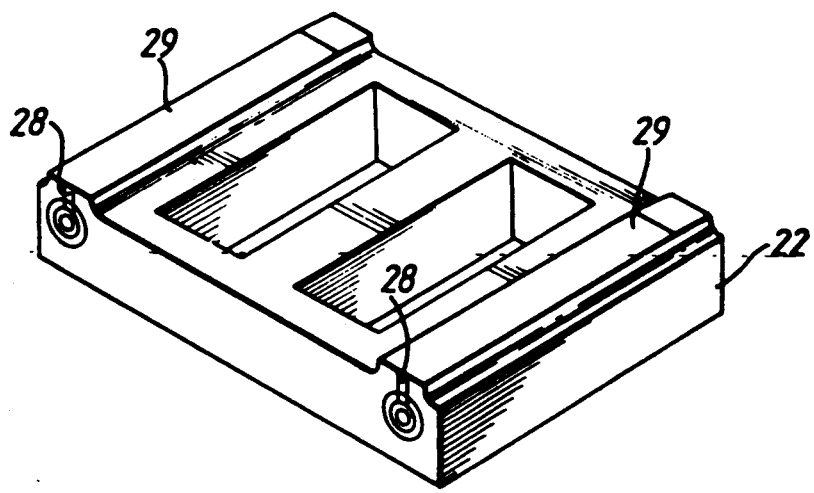
FIG. 4 is an enlarged perspective view of the head slider to be used in the other embodiment in this invention.
Figure 5:
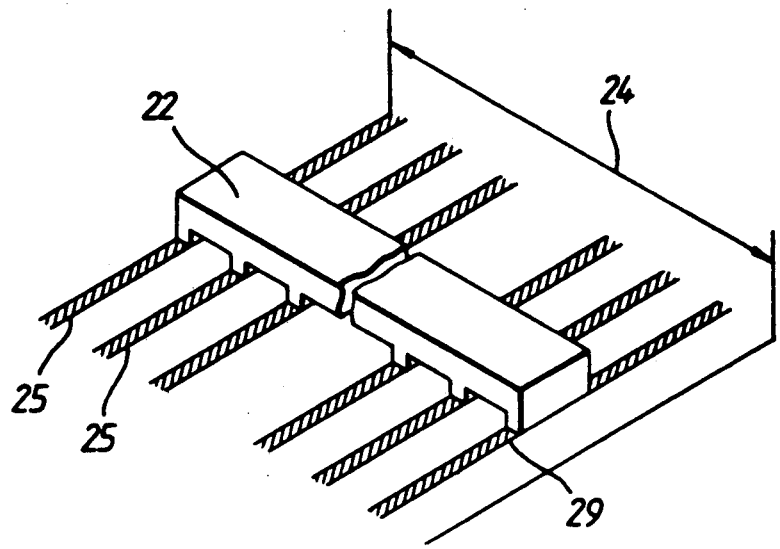
FIG. 5 is an important part perspective view of a further embodiment in this invention.

As to structure of head slider 22, it can be lightened by hollowing out a part of members of a head slider 22 to make them a skeleton as shown in FIG. 4. The larger the width of head slider is in this method, the more its effect becomes. The data recording and reproduction are performed by using arbitrarily a plural number of heads integrated in one slider 22 concurrently or separately. In a conventional device in which a plurality of head sliders are supported by a plural number of gimbals, since the gimbal itself has movability, it was difficult to keep constant the interval between these head gaps.

In this embodiment, since the head gap 28 is formed fixedly in one head slider 22, the interval of each head gap 28 can be kept constant. For instance, when the thermal expansion factor is made equal between the two by using ceramic for the substrates of the head slider 22 and magnetic disk 21, the amount of off-track due to the thermal expansion of magnetic disk 21 becomes equal to the change due to the thermal expansion in the interval of the respective head gap 28, this settling the problem òn the off-track due to the thermal expansion. By this, it becomes possible to record and reproduce data with the inner head while reading the positioning signal with the outer head, for instance.

Furthermore, as another embodiment, it is feasible to have a magnetic disk storage device by integrating N pieces of heads in one head slider 22 and by providing N pieces of landing zone 25 with the width of one landing zones taken as that of the ABS section 29 or, the width may be equal to a feature section other than the ABS section, and not always confined to the ABS section. That is, a structure can be taken to provide the head and ABS section separately. Next, each embodiment of this invention which employs a means to stabilize the floating posture of the head slider will be explained following.

Figure 6:
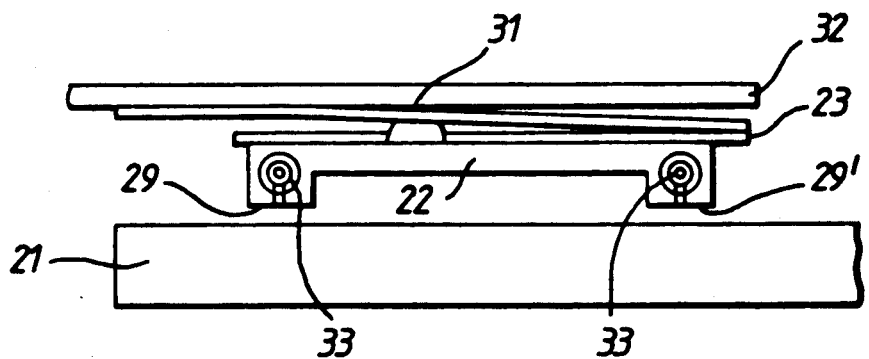
FIG. 6 is an important part sectional view of the further embodiment in this invention.

As shown in FIG. 6, the head slider 22 is supported by the gimbal 23, and the pivot 31 provided in the gimbal 23 comes into contact with the suspension 32 at one point. The head slider 22 makes a rotary movement freely in a movable range of the gimbal 23 with this point taken as a fulcrum. In this embodiment, the pivot 31 is positioned on the outer circumferential side of the magnetic disk 21 from the center line which is equally distant from two heads 23. Also, the width as well as the structure are equal in two ABS sections 29. In the figure, however, the rotary directon of the magnetic disk 21 is in the direction running from the reverse side to the obverse side at right angles to the paper surface, and the left end in the figure shows the outer circumferential side of the magnetic disk 21 and the right end the inner circumferential side.

Figure 7:
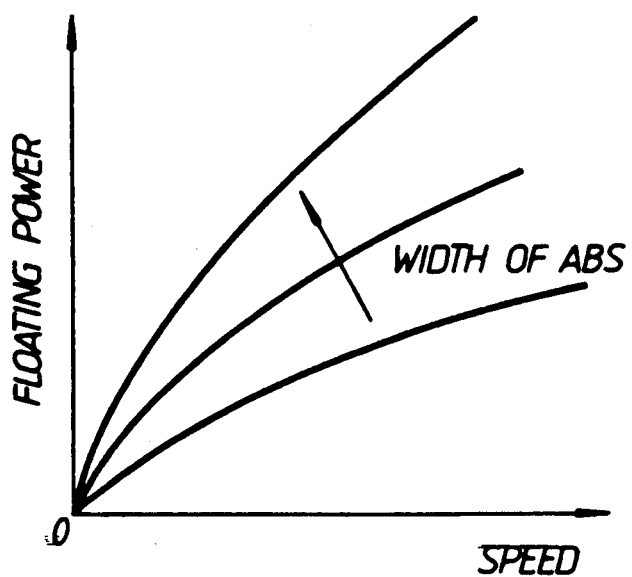
FIG. 7 is a graph for the description of operation in this invention.

According to the relative speed between disk 21 and head slider 22 caused by the rotation of the magnetic disk 21, a floating force is generated in the ABS section 29 of the head slider 22. There is a relation as shown in FIG. 7 between the floating force generated in the ABS section 29 and the speed. As the speed raises, the floating force becomes larger.

The relative speed between the ABS sections 29 and 29' of the head slider 22 and the rotating disk 21 is proportionate to the distance from the center of rotation of the magnetic disk 21 to the ABS sections 29 and 29'.

When the interval between two ABS sections 29 and 29' becomes relatively larger as compared with the radius of the magnetic disk 21, the difference in speed between two ABS sections 29 and 29' becomes larger.

Consequently, a difference occurs in the floating force generated in each of two ABS sections 29 and 29', too. The floating force generated in the outer side ABS section 29 becomes larger than that generated in the inner side ABS section 29'. Since the head slider 22 can be rotated with the pivot 31 taken as a center, when the pivot 31 is positioned in the center between the right and left ABS sections 29 and 29', the head slider 22 makes a rotary movement on account of the difference in the floating force between the two according to the reason given above, and the posture of the head slider 22 becomes unstable.

Now, in this embodiment, the pivot 31 is positioned outside of the center position of right and left ABS sections 29 and 29', so that the floating force generated in the right and left ABS sections is balanced and the angular moment centering around the pivot 31 becomes 0. By taking this method, it becomes possible to make equal the amount of float between two ABS sections 29 and 29' and thus the floating posture of head slider 22 is stabilized.

Figure 8:
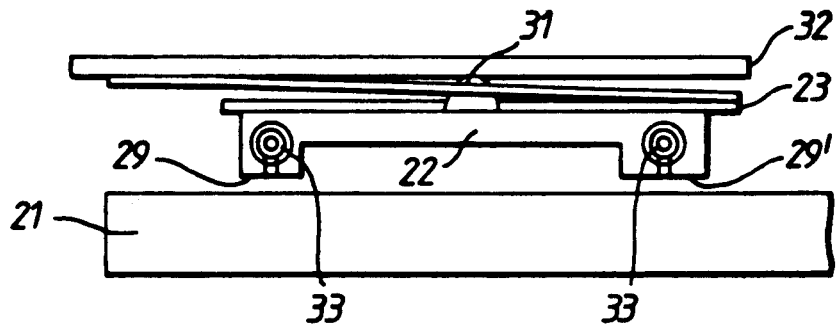
FIG. 8 is an important part sectional view of the further embodiment in this invention.

FIG. 8 shows another embodiment in which the posture of the head slider 22 is stabilized. In this embodiment, although the pivot 31 of the head slider 22 is positioned to be equal in distance from the two right and left heads 33, the width of the ABS sections of the head slider 22 is narrow on the outer circumferential side and wide on the inner circumferential side. Except the difference in this width, however, the structure of these two ABS sections 29 and 29' are basically the same as each other.

The relative speed between two ABS sections 29 and 29' of the head slider 22 and the magnetic disk 21 is fast on the outer circumferential side and slow on the inner circumferential side likewise in the case shown in FIG. 6. When the area is equal between two ABS sections 29 and 29', the floating force to be applied to these two ABS sections 29 and 29' becomes larger on the outer circumferential side and smaller on the inner circumferential side. Besides, there is a relationship between the width and floating force of the ABS sections in that the floating force increases as the width of the ABS section increases as shown in FIG. 7. To avoid this, an adjustment is made in this embodiment, so that the width of the ABS section 29 on the outer circumferential side is made smaller than the ABS section 29' on the inner circumferential side. By this, the floating force becomes equal between two ABS sections 29 and 29', thus enabling the floating posture of the head slider 22 to be stabilized.

Figure 9:
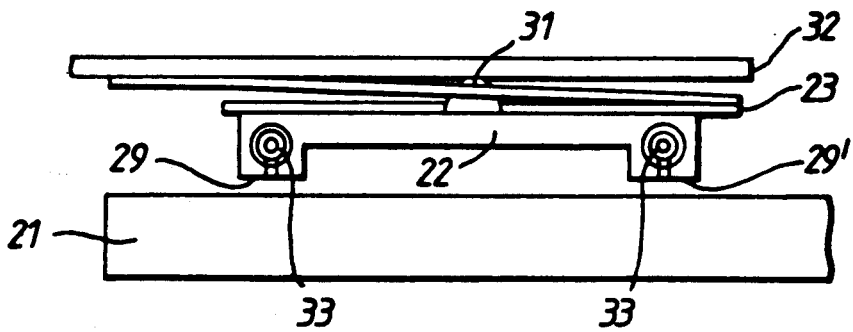
FIG. 9 is an important part sectional view of the further embodiment in this invention.
Figure 10:
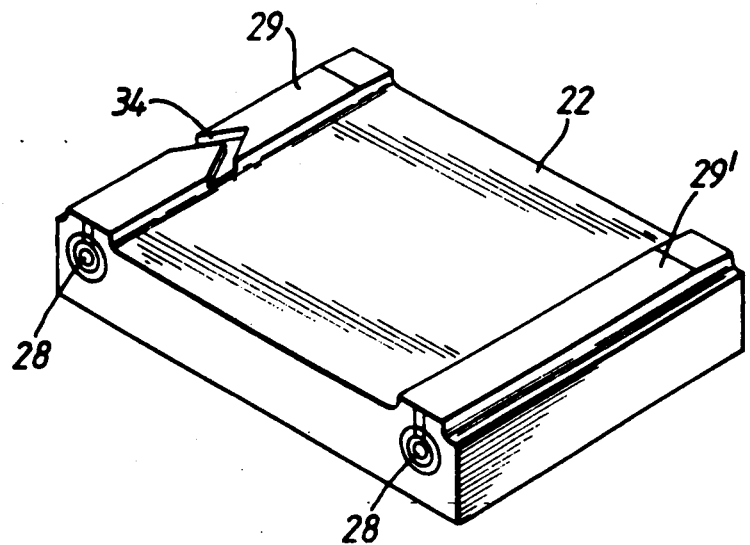
FIG. 10 is an enlarged perspective view of the head slider shown in FIG. 9.

FIGS. 9 and 10 show another embodiment to further stabilize the head slider 22.

In this embodiment, the pivot 31 of head slider 22 is equal in distance from two heads 33 and the width is also equal between two ABS sections 29 and 29' of the head slider 22. However, a negative pressure generating section 34 is provided in the ABS section 29 on the outer circumferential side as shown clearly in FIG. 10. The relative speed between the ABS sections 29 and 29' of the head slider 22 is fast on the outer circumferential side and slow on the inner circumferential side as stated above.

In case the area of the ABS sections 29 and 29' is equal between the outer circumferential side and inner circumferential side, the floating force applied to two ABS sections becomes larger on the outer circumferential side and smaller on the inner circumferential side. Now, in this embodiment, the floating force is reduced by providing a negative pressure generating section 34 in the ABS section 29 on the outer circumferential side and the floating force applied to two ABS sections 29 and 29' becomes equal to work out a structure not to cause angular moment around the pivot 31, even if the pivot 31 of the head slider 22 is equal in distance from two heads 33. By this, the amount of float becomes equal between two ABS sections 29 and 29' and the floating posture of the head slider 22 can be stabilized.

Incidentally, to stabilize the floating posture of head slider 22, it is possible to use all or a part of the measures shown in FIGS. 6, 8 and 9 or in combination. As a modification of the embodiment in FIG. 6, it is also possible to improve the magnetic characteristic of the head by making the amount of float of the ABS section 29' on the inner circumferential side much smaller as compared with that of the ABS section 29 on the outer circumferential side by providing the position of the pivot 31 of the head slider 22 on the inner circumferential side, not on the outer circumferential side, from the center line of head slider 22.

In addition, as a modification of the embodiment shown in FIG. 8, it is also possible to improve the magnetic characteristic of a head by reducing sharply the amount of float of the head on the inner circumferential side by making further smaller the floating force of the ABS section 29' on the inner circumferential side as compared with that of the ABS section 29 on the outer circumferential side by making larger the width of the ABS sections 29 and 29' of the head slider 22 and narrow on its inner circumferential side.

As a modification of the embodiment shown in FIGS. 9 and 10, it is further possible to improve the magnetic characteristic of a head by reducing sharply the amount of float on the inner circumferential side by making the floating force of the ABS section 29' on the inner circumferential side as compared with that of the ABS section 29 on the outer circumferential side by providing a negative pressure generating section in the ABS section 29' on the inner circumferential side of the head slider 22.

As to the other embodiments, it is also possible to work out a structure to improve the magnetic characteristic of a head by reducing sharply the amount of float of the ABS section on the inner circumferential side as compared with that of the ABS section on the outer circumferential side by combining all or some of the following means:

(1) To provide the pivot position of head slider on the inner circumferential side, not on the outer circumferential side, from the center line of the head slider.

(2) To make larger the width of the ABS section of head slider on the outer circumferential side of a disk, and smaller on the inner circumferential side.

(3) To provide a negative pressure generating section in the ABS section on the inner circumferential side of the head slider.

Even in a case where the number of heads is three or more and also three ABS are provided, it is possible to balance the floating force applied to a plural number of ABS sections of one head slider to stabilize the floating posture of the head slider by resorting to either one or any arbitrary combination of items (1), (2) and (3) shown below:
  (1) To position the pivot of the head slider of the gimbal which supports the head slider on the inside or outside from the center line of the head slider.
  (2) To make different the width of a plural number of ABS sections of one head slider.
  (3) To provide a negative pressure generating section in a part of each ABS section of the head slider, and to make different the size of this negative pressure generating section in each ABS section or to provide the negative pressure generating section in a particular ABS section only of a plural number of ABS sections.

Next, another embodiment in which the recording density of the track on the outer circumferential side is raised to prevent the use efficiency from being lowered by making smaller the width of the head on the outer circumferential side than that on the inner circumferential side will be explained using FIG. 11.

Figure 11:
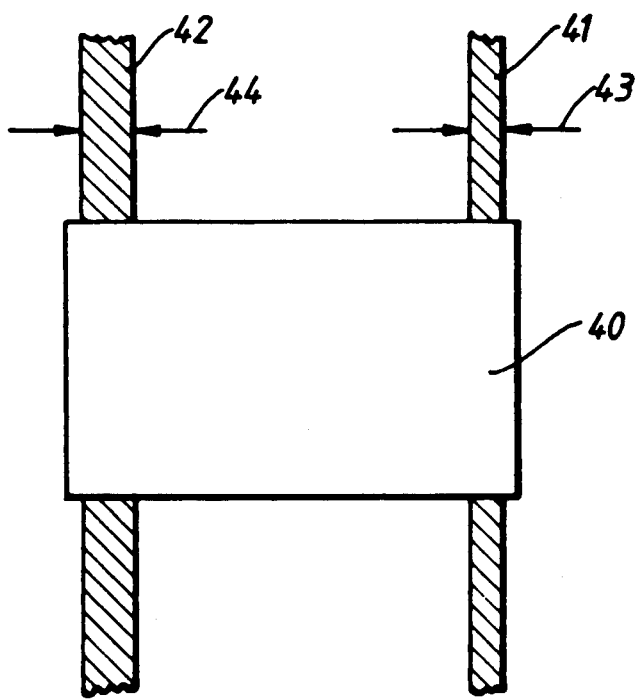
FIG. 11 is an important part top view of the further embodiment in this invention.

The embodiment in FIG. 11 shows a case of two heads, where the head slider has approximately a half of the width of the data recording and reproduction area of the magnetic disk. In the same figure, reference 40 shows the head slider, 41 shows the track on the outer circumferential side, 42 shows the track on the inner circumferential side, and 43 and 44 show the width of the track 41 and track 42, respectively.

In the conventional structure in which the width is made equal between the track on the outer circumferential side that on the inner circumferential side, suppose that the S/N of the track on the inner circumferential side is lower by 3 dB than on the outer circumferential side. The limit of recording density at this time is determined according to the S/N of the track on the inner circumferential side. When the recording density of the track is equal between the outer circumferential side and inner circumferential side, there is a room to raise the recording density on the outer circumferential side.

When the width 43 of track 41 on the outer circumferential side is set to a half of the width 44 of the track 42 on the inner circumferential side as shown in FIG. 11, the S/N become equal between tracks 41 and 42. Since the width of track 41 is a half of that track 42, the track density can be doubled in the half section on the outer circumferential side in the disk recording and reproduction area. Consequently, it is possible to make the number of tracks 1.5 times that of a case where the density is made equal between the inner circumferential and outer circumference.

When such a structure is used for the servo surface of a magnetic disk storage device which employs a servo surface servo method, the speed data under the speed control is obtained from track 42 which is larger in width on the inner circumferential side, and the positioning data from track 41 which is smaller in width on the outer circumferential side. The head can be moved at twice the speed of a case were the speed data is obtained from track 41 on the outer circumferential side under the speed control.

As compared with a case where all tracks have an equal width, it can have twice the positioning accuracy. Such a servo structure is suitable to a case where two or more heads are mounted on one slider and a change in the relative position between heads due to thermal expansion, etc., does not pose any problem in this respect in this invention. This embodiment has features in that the point of component parts can be increased by raising the track density in the disk outer circumference which had a room in the conventional recording density, that the structure can be changed greatly, and that the capacity of the entire magnetic disk is made larger without using high performance component parts.

Figure 12:
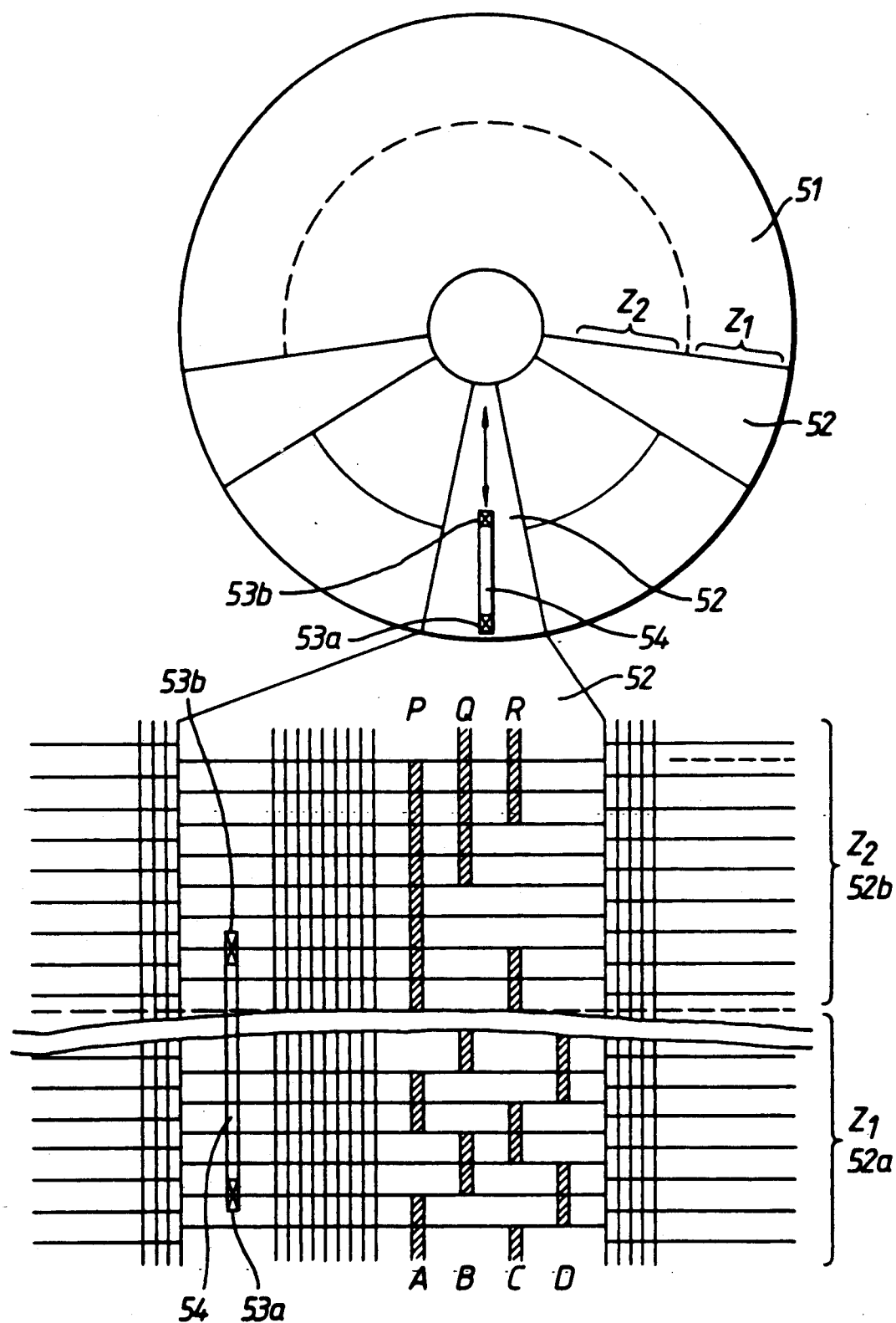
FIG. 12 is an important part enlarged view of the further embodiment in this invention.

Next, other embodiments in this invention will be explained below. The following are descriptions of embodiments in which precise positioning is made feasible by reducing the rate of servo pattern occupying the entire data area and by securing the track detecting capacity referring to figures. In FIG. 12, reference 51 is a magnetic disk and servo sector 52 is formed in a part of the disk by dividing it in the circumferential direction. While, 53a and 53b are a pair of magnetic heads mounted on one head slider 54. The interval between head gaps, that is, the interval between magnetic heads 53a and 53b, is formed approximately a half of the entire data recording and reproduction area. The magnetic head 53a on the outer circumferential side takes charge of the outer half of the recording and reproduction of the entire data recording area, and the magnetic head 53b on the inner circumferential side takes charge of the recording and reproduction of the inner half of the entire data recording area. Consequently, each head 53a and 53b can access the tracks in the entire data recording area merely by seeking approximately a half of the entire recording area.

On the other hand, in the conventional device having a structure to provide one head for one head slider, the head has to make a seek operation just the same distance as the width of the entire data recording area. It is known from these facts that the seek distance of magnetic heads 53a and 53b can be reduced to a half of the conventional ones in this embodiment. When a plural number of heads are provided for one magnetic disk, there was a problem in conventional devices that the weight of the head carriage increased as a whole, since each head was supported by a separate gimbal. In this embodiment, a structure is realized in which one head slider 54 composed of two heads 53a and 53b is supported by one gimbal. Since the increase in the weight of the head slider 54 itself caused by the enlargement of the width of head slider 54 is far smaller as compared with the weight of one gimbal, the weight is little increased as compared with a case where two sets of head sliders and gimbals are used. From these, it becomes possible in this embodiment to increase the number of heads per one disk and to shorten the seek distance without increasing the weight of the head actuator.

Further, the embodiment in this FIG. 12 is so designed that a precise track position can be detected and the track positioning servo signal can therefore be obtained, since the magnetic head 53a on the outer circumferential side takes charge of area $z_1$ of the outer half of the entire data area and the servo pattern in the servo sector 52a in this are $z_1$ forms a two-phase Di-bit pattern with four tracks taken as one cycle.

On the other hand, the magnetic head 53b on the inner circumferential side takes charge of area $z_2$ of the inner half of the entire data area. The servo pattern in servo sector 52b in this area $z_2$ forms a coarse pattern with 16 tracks taken as one cycle, this making it possible to detect the track position when magnetic heads 53a and 53b are moved at high speed. At this time, the servo data is read from magnetic heads 53a and 53b, through which the whole of the head slider 54 is controlled in its positioning according to the servo data of the both heads 53a and 53b. Since the magnetic heads 53a and 53b are composed on a same head slider 54, the relationship between the fine servo patterns A, B, C and D on the outer circumferential side and coarse servo patterns P, Q and R on the inner circumferential side is the same as shown in the example of a conventional magnetic disk storage device (shown in FIG. 24).

Figure 24:
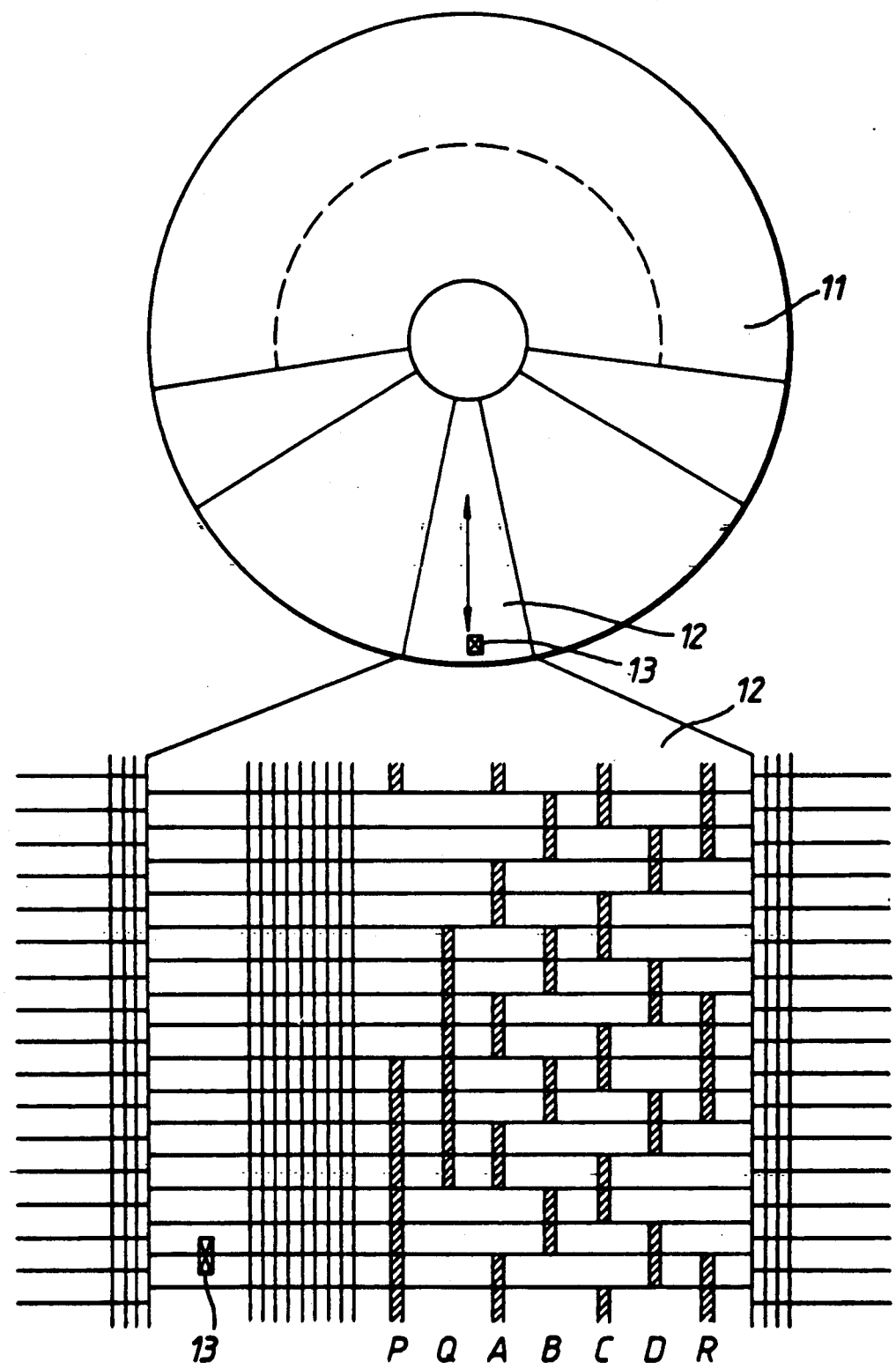
FIG. 24 is an important part enlarged view of conventional device.

Since the magnetic disk storage device shown in FIG. 24 is of a structure composed of one head 13 for one head slider, it is necessary to form all servo patterns of P, Q A, B, C, D and R thoroughly from the outer circumference to the inner circumference, this making larger the rate of servo patterns occupying the entire data area. In the embodiment of this invention, the fine servo patterns A, B, C and D are formed beforehand in the magnetic head 53a area on the outer circumferential side and coarse servo patterns P, Q and R in the magnetic head 53b area on the inner circumferential side separately, through which these two servo patterns can be read concurrently through each head of 53a and 53b; The rate of servo patterns occupying the entire data area can be reduced, and yet a precise head detecting capacity can be secured as in the conventional ones.

Figure 13:
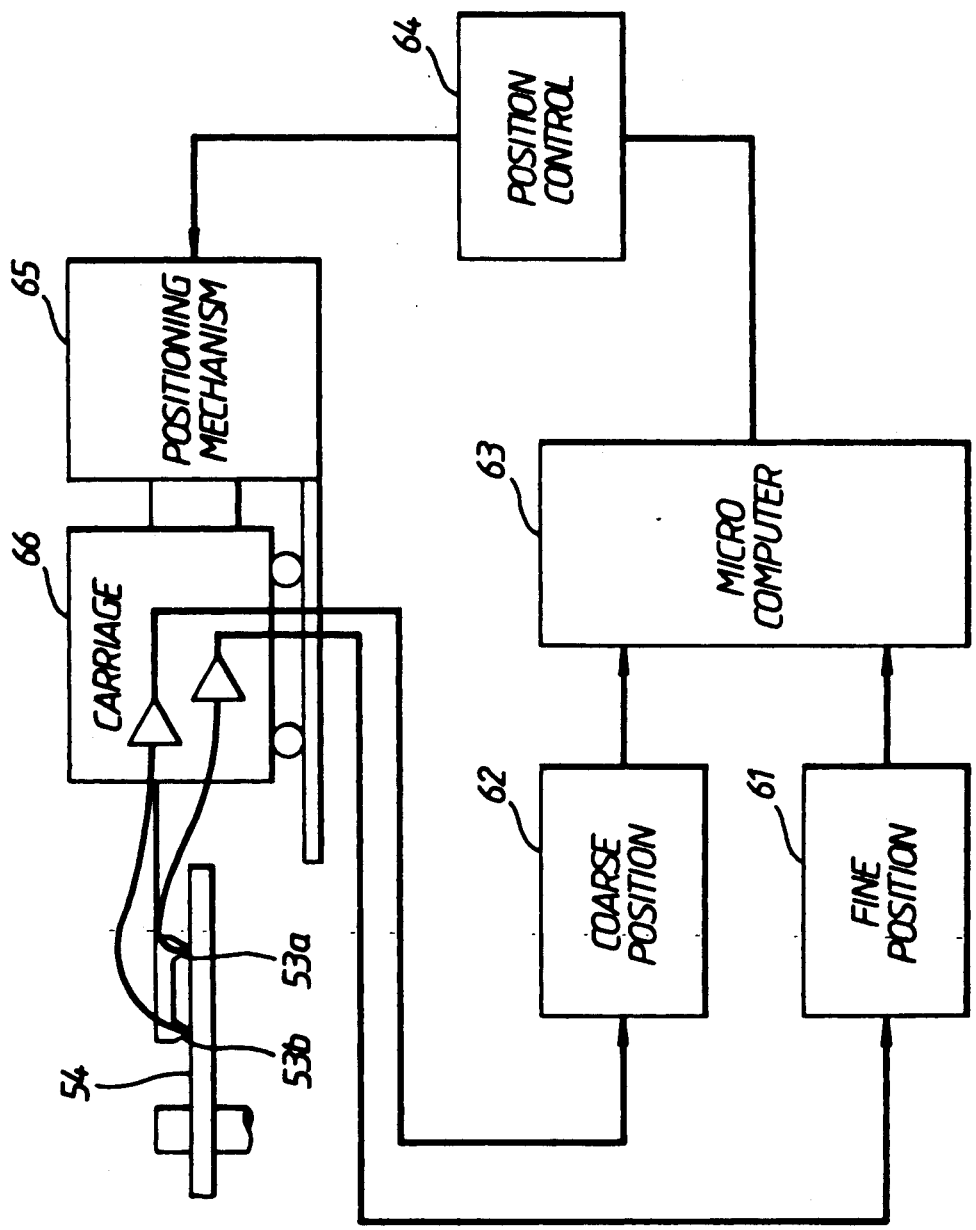
FIG. 13 is a circuit diagram to be used in embodiment in this invention shown in FIG. 12.

FIG. 13 is a configuration block diagram of the positioning system of this magnetic disk storage device. The fine positioning signal is detected by the fine positioning signal detector circuit 61 according to the fine servo patterns read through magnetic head 53a and the coarse positioning signal is detected by the coarse positioning signal detector circuit 62 according to the coarse servo patterns read through magnetic head 53b, and these signals are fetched by the microcomputer 63. The microcomputer 63, under the track follow-up control, reproduces the fine positioning signal from the fine positioning signal, sends it to the positioning control circuit 64, and controls carriage 66 through the positioning mechanism 65.

While, under the speed control, the microcomputer 63 operates the position and moving speed of head slider 54 according to the coarse positioning signal and precise positioning signal and, sends the control signal to the positioning control circuit 64 so that head slider 54 can be moved smoothly up to the target tracking position to control the carriage 66 through the positioning mechanism 65.

Figure 14:
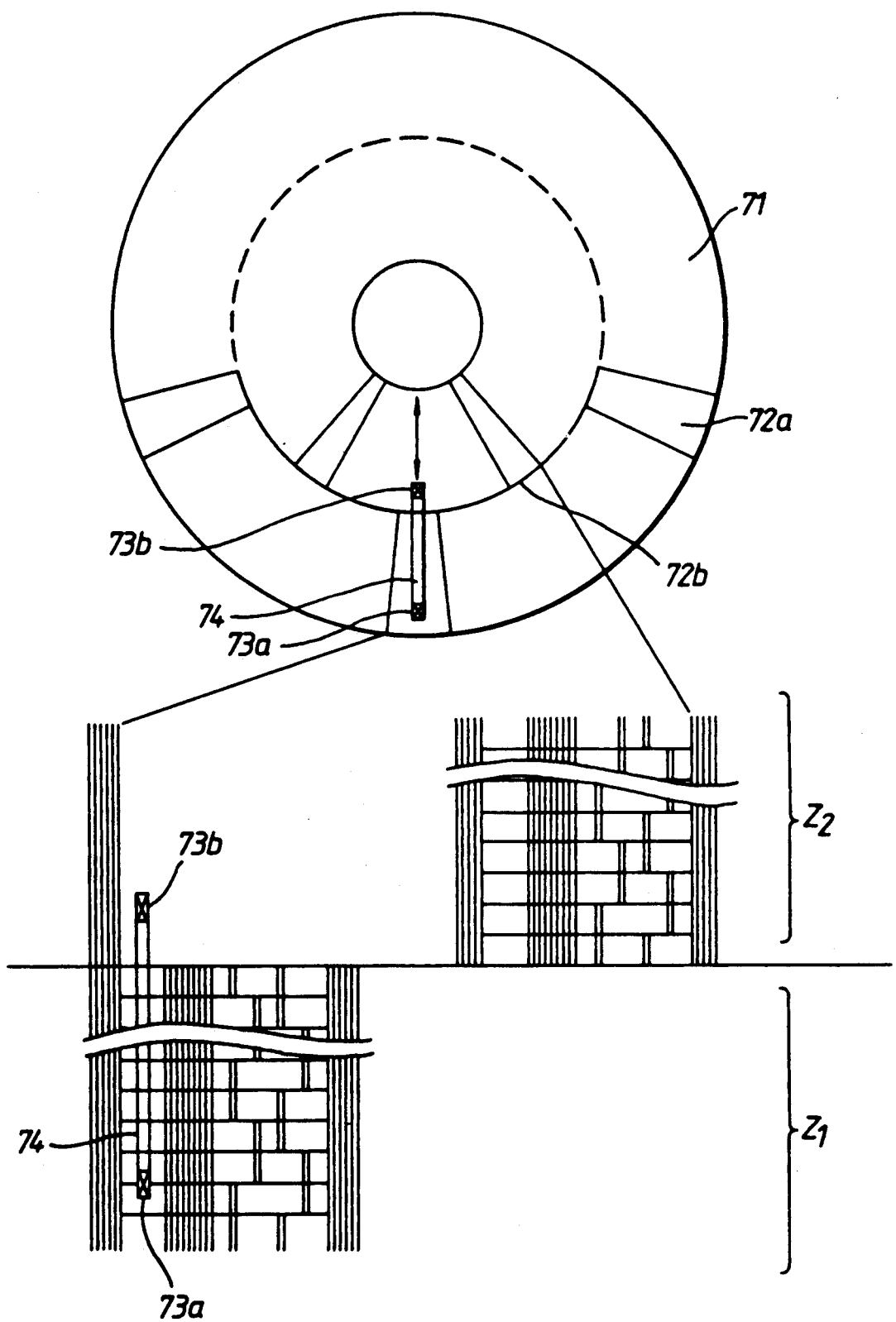
FIG. 14 is an important part enlarged view of the further embodiment in this invention.

FIG. 14 shows the other embodiment of this invention. This embodiment is to divide the surface of magnetic disk in the circumferential direction to form servo patterns corresponding to each area taken charge by each magnetic head. In FIG. 14, reference 71 is the magnetic disk which is divided in the circumferential direction, and on which servo sectors 72a and 72b are formed in a different position (a different angular interval) in areas taken charge by each magnetic head 73a and 73b. In the same figure, reference 74 is the head slider and magnetic head 73a and 73b are provided on its both ends.

Incidentally, the interval of head gaps, that is, the interval between magnetic heads 73a and 73b, is set to approximately a half of the entire data area as in the embodiment shown in FIG. 12. In this embodiment, too, the seek distance between magnetic heads 73a and 73b can be reduced to a half as compared with the conventional ones as in the embodiment shown in FIG. 12. In the embodiment shown in FIG. 14, the magnetic head 73a on the outer circumferential side takes charge of area $z_1$ of the outer half of the entire data area, while the magnetic head 73b on the inner circumferential side takes charge of area $z_2$ of the inner half of the entire data area.

Servo sectors 72a and 72b are formed in different position (angular interval) in their respective areas $z_1$ and $z_2$. The servo data is read by magnetic heads 73a and 73b, and the whole of the head slider 74 is controlled in positioning according to the servo data of these two heads 73a and 73b. Since magnetic heads 73a and 73b are composed on a same head slider 74, the positioning can be made accurately, even if the servo data is read alternately by each servo sector 72a and 72b for the positioning.

Figure 15:
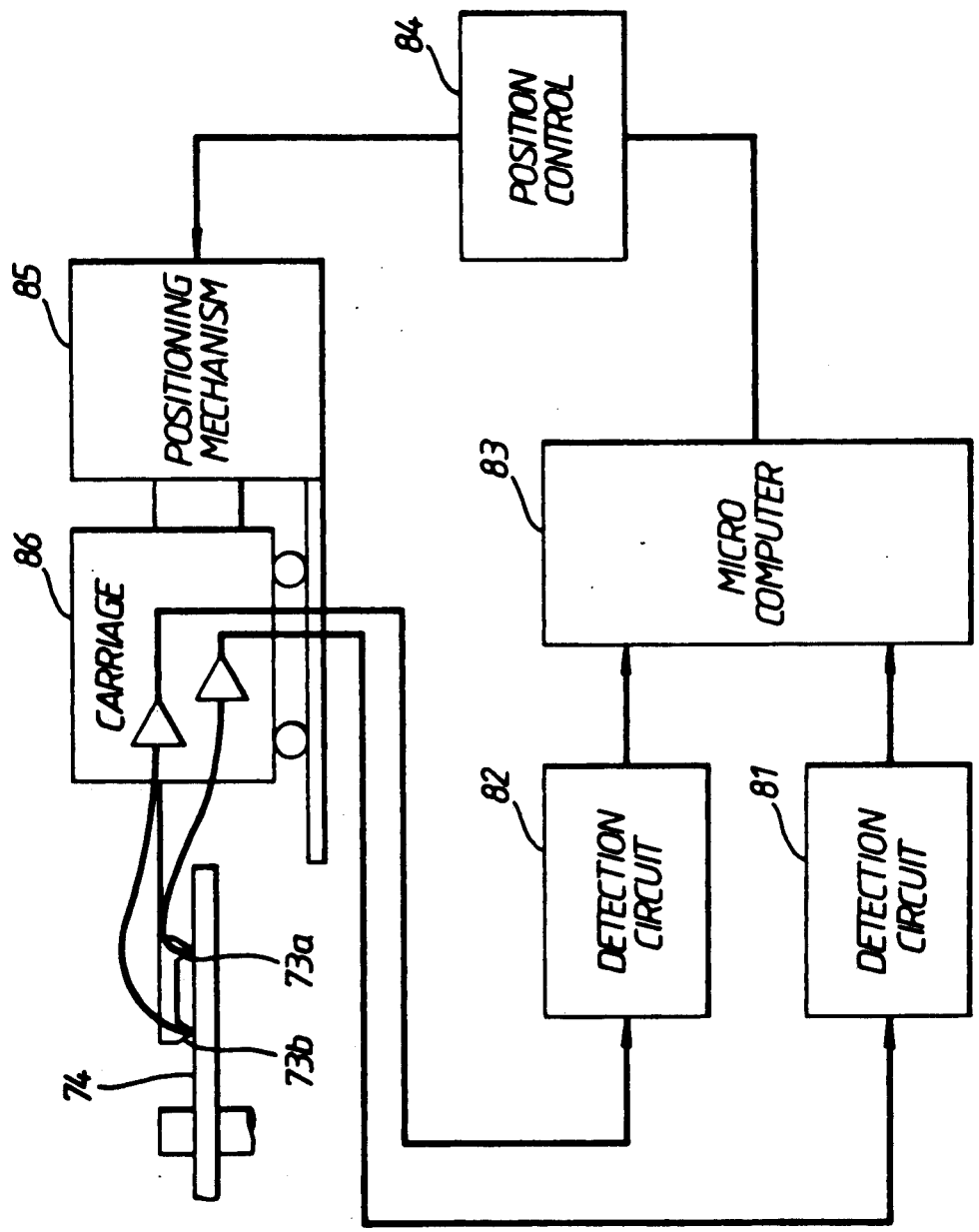
FIG. 15 is a circuit diagram used for the embodiment in this invention shown in FIG. 14.

In a conventional device in FIG. 24, since the magnetic disk storage device is composed of one head 13 for one head slider, a servo sector with two times of area is required from the outer circumference to the inner circumference thoroughly to obtain the servo data at the same sampling as that shown in FIG. 14, this making larger the rate of servo patterns occupying the entire data area. In the case of this embodiment, it is clear that the servo pattern occupying area can be reduced sharply as compared with the conventional ones. FIG. 15 shows the head positioning system configuration block diagram of this embodiment.

Figure 16:
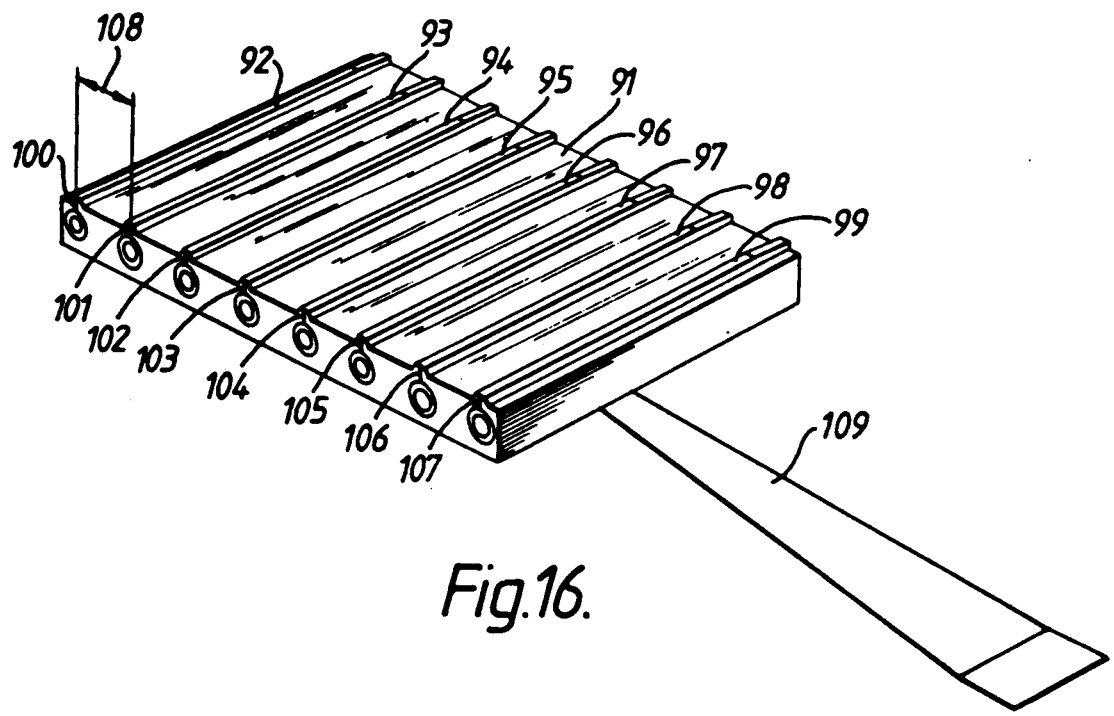
FIG. 16 is an enlarged perpective view of the head slider to be used on the further embodiment in this invention.

The position signal is detected in the position signal detection circuits 81 and 82 from the servo pattern read alternately by magnetic heads 73a and 73b and the signal is fetched by microcomputer 83. This computer 83 reproduces the position signal and sends it to the positioning control circuit 84 to control the carriage 86 through the positioning mechanism 85. Although the above description is made in the case where two magnetic heads are provided in this embodiment, the number of magnetic heads can be increased appropriately in this invention. Next, other embodiments this invention will be explained as follows:

FIG. 16 shows the magnetic head pertaining to this invention. As shown, eight magnetic heads are provided for one head slider 91, the head gap interval 108 of two heads adjacent to these eight heads are more than approximately one-eighth of the width of the entire recording and reproducing area on the magnetic disk and yet smaller than the width of the entire recording and reproducing area, and each of these eight head gaps 100 to 107 is positioned independently in the ABS sections 92 to 99 of the aobve-mentioned head slider 91. That is, these eight ABS sections provided on the head slider do not get in contact with the above-mentioned magnetic disk other than the ABS sections in CSS. The, head slider 91 is set to the actuator through gimbal 109. Note here that the head slider 91 used must be as close as possible to the magnetic disk in its thermal expansion coefficient.

Figure 17:
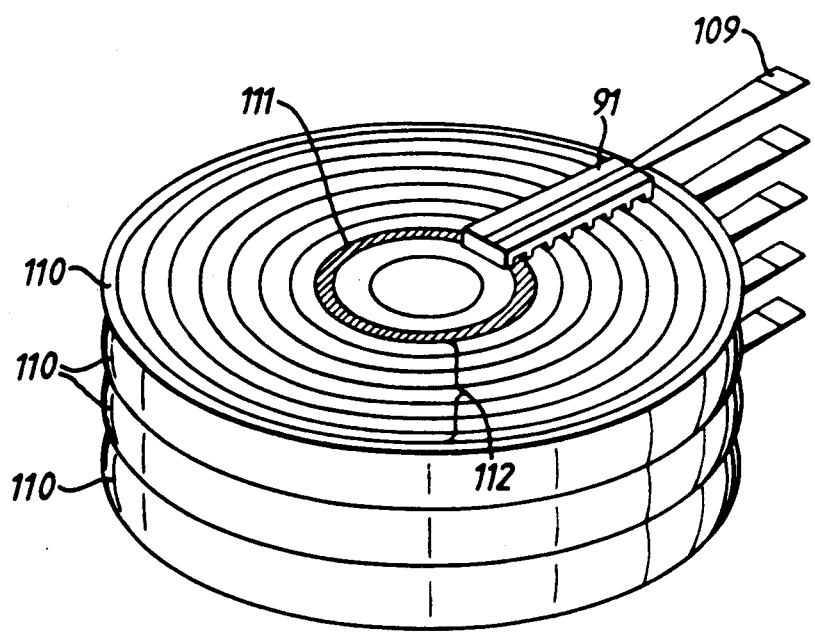
FIG. 17 is an important part perspective view of the further embodiment in this invention using the head slider shown in FIG. 16.

FIG. 17 shows the relation between the magnetic heads (slider + eight heads) and the servo data formed on the magnetic disk 110. There are four magnetic disks 110 provided in this embodiment, so they have eight accessing surfaces. The magnetic head 100 positioned in the innermost circumference of eight heads provided on the above-mentioned one head slider for each of these eight disk surfaces is used exclusively for servo without recording or reproducing data. The width of its core is two times of heads 101 to 107 for data. The area 111 on the disk to which the servo head 100 is accessed uses the area further on the inner part than the innermost circumference of the data area which is determined by the maximum linear recording density of data, where the continuous servo data is written throughout the area beforehand. Then, the above-mentioned servo data is read with the above-mentioned servo only head, through which the head positioning is made to the track within the servo data area decided.

Heads 101 to 107 for data recording and reproduction are formed on a same head slider 91 together with the servo only head 100. As the servo head is positioned in the above-mentioned track, they are positioned in their corresponding position within the data recording and reproduction area.

On the other hand, the signal frequency of the servo data is lower as compared with the data recording frequency. It uses the minimum recording frequency in general and 1F frequency in the MFM modulation method when employed. Since the width of core of the servo head is two times of the data head as mentioned above, the S/N of the servo signal is enough, even if it is positioned further inner part of the data recording and reproducing area in general. Consequently, when all of the servo data area are formed on the inner side from the innermost circuumference to be determined by the maximum linear recording density, the formatting efficiency is not lowered at all due to the formation of this servo data. Even when all servo data areas are formed within the area where the data can be recorded, the format area at this time is the same as the case of the so-called servo surface servo method in which the servo only surface is provided on one disk.

Figure 18:
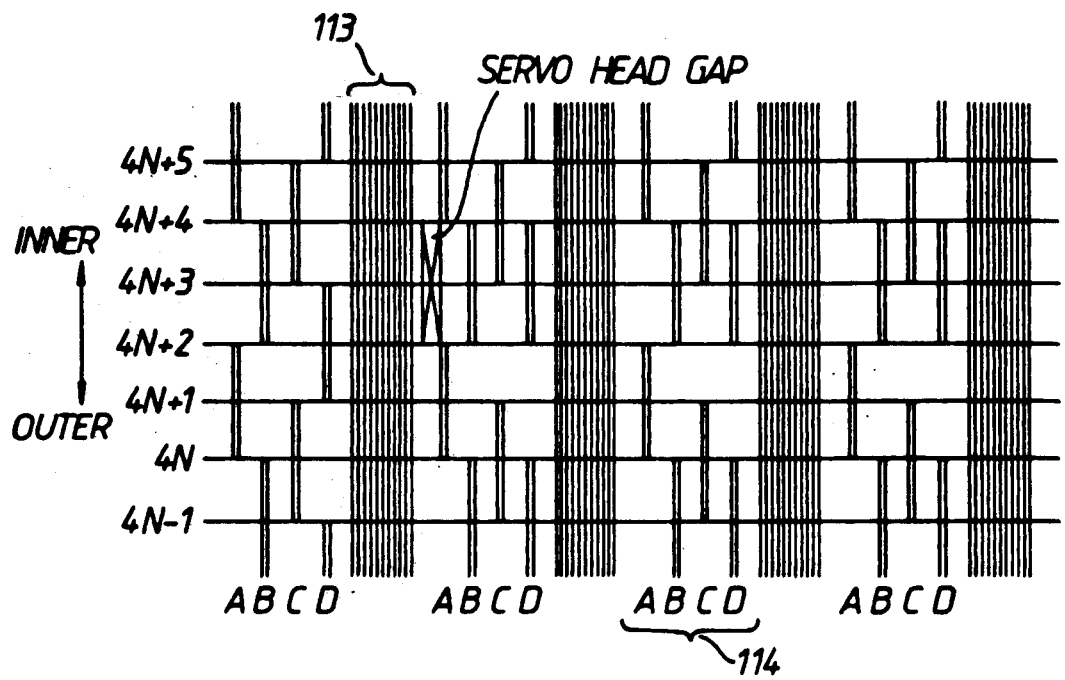
FIG. 18 is an important part diagrammatic view of FIG. 17.

Servo patterns are formed beforehand in the servo data area as shown in FIG. 18 and the signal of the SYNC area 113 is the synchronous signal to fetch the position data 114. The position signal which is read and generated by the servo head having two times of core width of the data head becomes two-phase position signals x25 and y26 at 4-track cycle shown in FIG. 19(a). The servo only head is positioned for each track using the following position signals (where N indicates an integer):

| 4N track | Position signal x(= A − B) |
|---|---|
| 4N + 1 track | Position Signal y(= C − D) |
| 4N + 2 track | Position Signal −x(= B − A) |
| 4N + 3 track | Position Signal −y(= D − C) |

Figure 19:
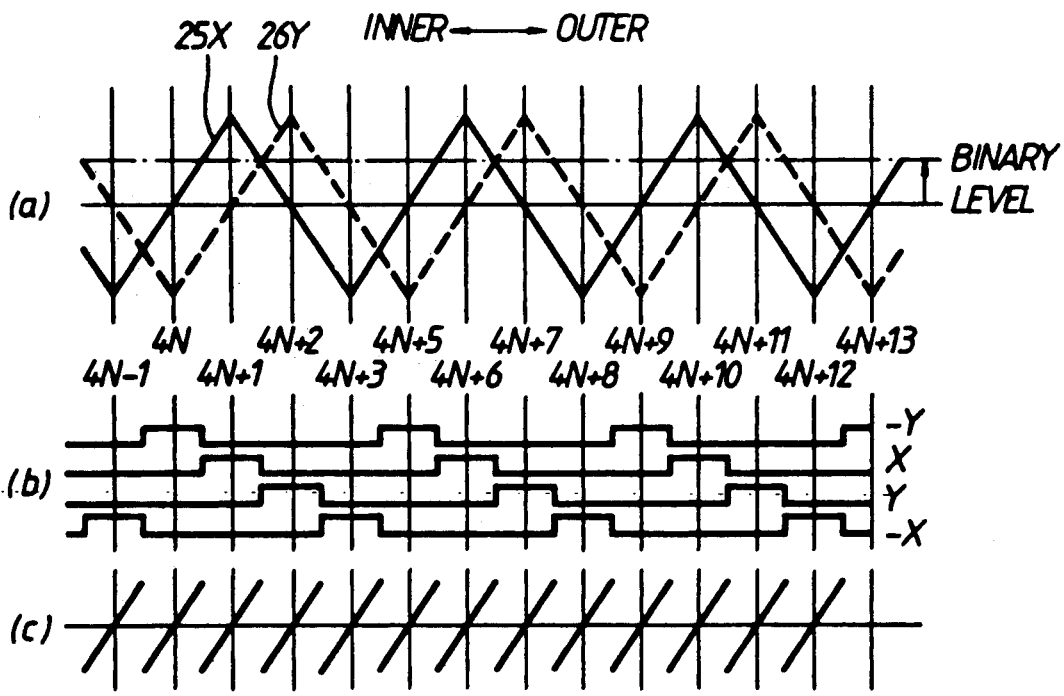
FIG. 19 is a timing chart for the description of operation in this invention.
Figure 20:
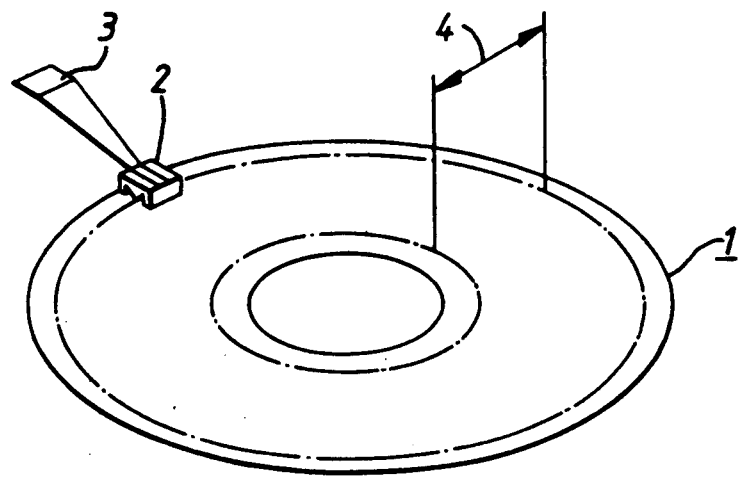
FIG. 20 is an important part perspective view of conventional device.
Figure 21:
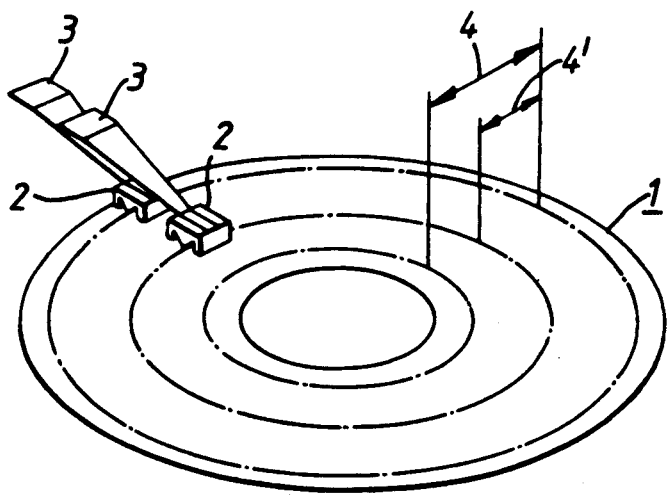
FIG. 21 is an important part perspective view of an other conventional equipment.
Figure 22:
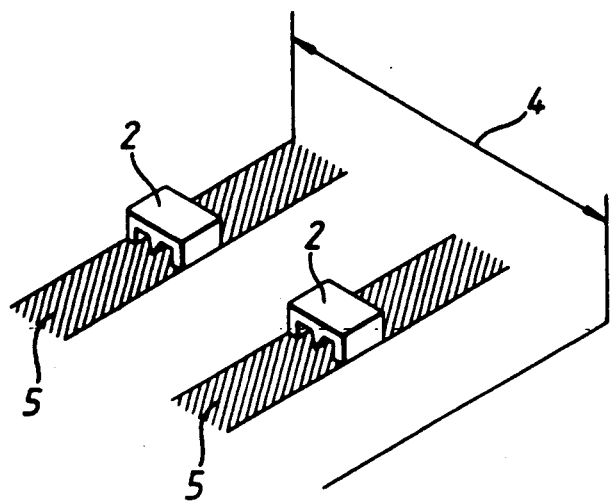
FIG. 22 is an important part enlarged perspective view of FIG. 21.
Figure 23:
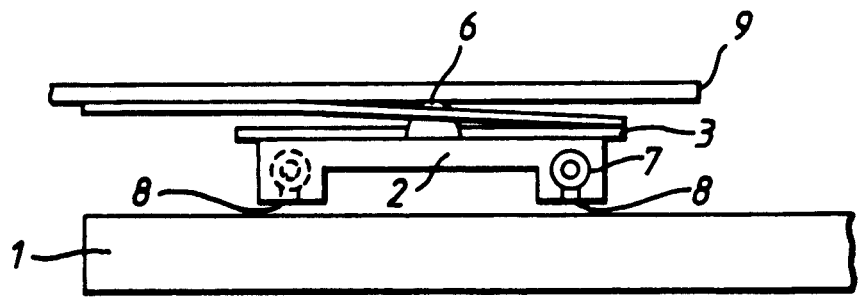
FIG. 23 is an important part sectional view of the head slider to be used in conventional device.

These position signals are selected by selecting the analog switch using the signal shown in FIG. 19(b) which is obtained by binary coding of each position signal. The position signal is obtained as shown in FIG. 19(c) in the output of this analog switch as the result. The speed of a head can be obtained by differentiating the output of the analog switch. The positioning control is performed by means of a speed control to move the head at a head speed to the vicinity of a target track and a positioning control to make the head follow up the target track accurately.

Aimed at moving the head effectively at a high speed in this speed control, a target speed profile is prepared beforehand according to the distance from the current track and a speed feedback control is applied to the head actuator to make the head follow up this target speed. When the head enters a prescribed distance for the target track, the speed control is changed over to the position control. In the speed control at this time, the speed is controlled to become almost zero (0). When changed over to the position control, the above-mentioned position signals are to be used according to the target track. In the position control, the stiffness is taken higher in the servo loop and a phase-lag compensation is applied to the low frequency zone to make the head follow up the target track enough with no steady error and also a phase-lead compensation is applied to the vicinity of the servo zone in serial to take a large enough phase margin to realize a stablized servo system.

Although the number of magnetic heads is assumed to be eight in the above-mentioned embodiment for instance, the seek time is generally proportionate to the total weight of movable parts, seek distance, and thrust constant as shown in the following equation.

$$t \propto \sqrt{m \cdot x/kf}$$

(t: seek time, m: total mass of movable parts, x: seek distance and kf: thrust constant)

The smaller the former two are, the shorter the seek time becomes. So, the larger the number of heads provided for one slider is, the shorter the seek distance/seek time becomes. And yet, the more the number of heads is, the narrower the area to which one head accesses becomes. This causing the area used for the servo data area to be lessened and the formatting efficiency to be improved. When a part of the head is hollowed out to make it into a skeleton structure to lessen the total weight of movable parts, the seek time can be shortened further.

As for the thermal off-track which causes a trouble in the servo surface servo method, since the servo head and the other data heads are provided through a slider only accordingly to this invention, the trouble can be removed completely and no off-track occurs due to a mechanical deviation, only if the thermal expansion coefficient of the slider is taken the same as that of the magnetic disk.

In addition, since a continuous servo data can be obtained in this embodiment, the high frequency zone of the off-track can be obtained, the servo frequency zone can be taken higher, and a high stiffness can be obtained. This resists to disturbance and makes the settling time short. Furthermore, since the servo data is formed even in the inner circumference than the area to record and reproduce data in general in this embodiment, it prevents the lowering in the formatting efficiency due to the servo data. When a number of heads are provided for one slider, all of the servo data areas can be formed inside from the innermost circumference to be determined by the maximum linear recording density. By this, the formatting efficiency is not lowered at all by the formation of servo data.

In addition, this embodiment provides only slider as compared with conventional ones which provide several heads (head+slider). When some members other than the ABS section are made into a skeleton structure, the seek distance can be shortened by 1/N without increasing the weight sharply, and the seek time can be reduced effectively to a large degree.

What is claimed is:

1. A magnetic disk storage device, comprising:
   a magnetic disk having a disk surface including an inner side and an outer side with a storing/reproduction region formed thereon;
   a head slider facing the disk surface and having a plurality of parallel projections to generate an air bearing, including an inner floating value and an outer floating value;

a plurality of magnetic heads, each having a head gap in one of said projections; and means for compensating differences of said floating values of said magnetic heads based on circumferentially different speeds on the inner side and the outer side of the disk surface.

2. The magnetic disk storage device according to claim 1, wherein projections are provided on both sides of the head slider and are parallel to the running direction of the head slider.

3. The magnetic disk storage device according to claim 2, wherein a hollowed out portion is formed between projections of the head slider.

4. The magnetic disk storage device according to claim 2, wherein a negative pressure generating section is provided of one of said projections.

5. The magnetic disk storage device according to claim 2, wherein said magnetic heads have different widths.

6. The magnetic disk storage device according to claim 2, wherein said projections have different widths.

7. The magnetic disk storage device according to claim 1, wherein a negative pressure generating section is provided on at least one of said projections.

8. The magnetic disk storage device according to claim 7, wherein said negative pressure generating section is formed by removing a part of at least one of said projections.

9. The magnetic disk storage device according to claim 1, wherein said magnetic heads have an interval between neighboring head gap of at least 1/N of the width of the storing/reproduction region of the disk, where N is the number of heads.

10. The magnetic disk storage device according to claim 1, wherein said magnetic heads are able to operate independently of each other.

11. The magnetic disk storage device according to claim 1. wherein at least two of said magnetic heads have different widths.

12. The magnetic disk storage device according to claim 1, wherein said compensating means includes means for shifting the rotative center of the head slider in the vertical plane in the running direction of the head slider being eccentric to the center of the head slider.

13. The magnetic disk storage device according to claim 1. wherein the storing/reproduction region includes servo regions.

14. The magnetic disk storage device according to claim 13, wherein the servo regions corresponding to different magnetic heads having different patterns respectively.

15. The magnetic disk storage device according to claim 14, wherein inner side servo patterns are finer than outer side patterns.

16. The magnetic disk storage device according to claim 14, wherein different servo patterns have a same phase.

17. The magnetic disk storage device according to claim 13, wherein head sliders are controlled using positioning signals of the servo patterns.

18. The magnetic disk storage device according to claim 1, wherein said compensating means includes means for changing widths of said each projections.

19. A magnetic disk storage device, comprising:
a magnetic disk having a disk surface with a storing-/reproduction region including a servo region formed thereon;
a head slider facing the disk surface and having two parallel projections to generate an air bearing;
two magnetic heads, each having a head gap in one of said projections in which an outer head stores and reproduces on an outer side of the storing/reproduction region and an inner head stores and reproduces on an inner side of the storing/reproduction region;
said two magnetic heads having an interval between head gaps of at least $\frac{1}{2}$ of the width of the storing-/reproduction region of the disk.

20. The magnetic disk storage device according to claim 19, wherein the outer side of the storing/reproduction region is a fine servo pattern and the inner side of the storing/reproduction region is a coarse servo pattern.

21. A magnetic disk storage device, comprising:
a magnetic disk having a disk surface with a storing-/reproduction region including a servo region formed thereof, said storing/reproducing region having a width, said servo region storing coarse servo signal and a fine servo signal;
a head slider facing the disk surface and having a plurality of parallel projections to generate an air bearing;
two magnetic heads each having a head gap in one of said projections and having an interval between head gaps of at least one half of the width of the storing/reproduction region of the disk;
a coarse servo positioning signal detector circuit detecting the coarse servo signal obtained by an inner head;
a fine servo positioning signal detector circuit detecting the fine servo signal obtained by an outer head;
a positioning control circuit controlling the position of the head using outputs of said detector circuits.

* * * * *